United States Patent [19]

Tsukamoto

[11] Patent Number: 5,750,062
[45] Date of Patent: May 12, 1998

[54] METHOD OF MANUFACTURING AN AIR BAG COVER

[75] Inventor: Yasuhiro Tsukamoto, Patchogue, N.Y.

[73] Assignee: TRW Inc., Cleveland, Ohio

[21] Appl. No.: 508,422

[22] Filed: Jul. 31, 1995

Related U.S. Application Data

[63] Continuation of Ser. No. 955,419, Oct. 2, 1992, abandoned.

[51] Int. Cl.[6] .................. B29C 45/14; B29C 45/16
[52] U.S. Cl. .................................. 264/154; 264/255
[58] Field of Search .................. 264/250, 255, 264/259, 275, 293, 294, 328.8, 328.7, 154; 280/730, 731, 732

[56] References Cited

U.S. PATENT DOCUMENTS

| | | | |
|---|---|---|---|
| 2,337,550 | 12/1943 | Crosby | 264/255 |
| 2,755,125 | 7/1956 | Hodges | 280/732 |
| 3,051,994 | 9/1962 | Carozzo | 264/245 |
| 3,622,176 | 11/1971 | Byer | 280/150 AB |
| 3,968,979 | 7/1976 | Schiesterl | 280/731 |
| 4,148,503 | 4/1979 | Shiratori et al. | 280/731 |
| 4,157,883 | 6/1979 | Mares | 264/255 |
| 4,201,209 | 5/1980 | LeVeen et al. | 264/255 |
| 4,275,030 | 6/1981 | Mares | 264/255 |
| 4,335,068 | 6/1982 | Hemery | 264/255 |
| 4,508,676 | 4/1985 | Sorenson | 264/255 |
| 4,752,083 | 6/1988 | Honda | 280/731 |
| 4,995,638 | 2/1991 | Shinto et al. | 280/731 |
| 5,002,307 | 3/1991 | Heirdorn | 264/259 |
| 5,013,065 | 5/1991 | Kreuzer | 280/743 |
| 5,060,971 | 10/1991 | Nanbu et al. | 280/728 |
| 5,131,678 | 7/1992 | Gardner et al. | 264/46.5 |
| 5,183,615 | 2/1993 | Zushi | 264/259 |
| 5,192,478 | 3/1993 | Caskey | 264/255 |

Primary Examiner—Angela Ortiz
Attorney, Agent, or Firm—Stephen E. Feldman

[57] ABSTRACT

A cover for an air bag comprising a lid portion and mounting side wall portions having upper and lower ends, the upper ends connected to the lid portion and the lower ends adapted for connection to either a fixed part of a vehicle or another part. The lid portion has a weakened line which ruptures when the air bag is deployed. The cover is an integral structure. The lid comprises a flexible and soft layer whereas the mounting side walls comprise a rigid layer and both layers are united at their points of contact or contact regions.

A method for manufacturing the above described cover by injecting thermoplastic synthetic resin elastomer material through a first entry point(s) into a first mold cavity of an injection-mold for molding the lid portion and injecting thermoplastic synthetic resin material through a second entry point(s) into a second mold cavity of an injection-mold for molding the mounting side wall portions, the first and second molds being in communication with each other.

5 Claims, 5 Drawing Sheets

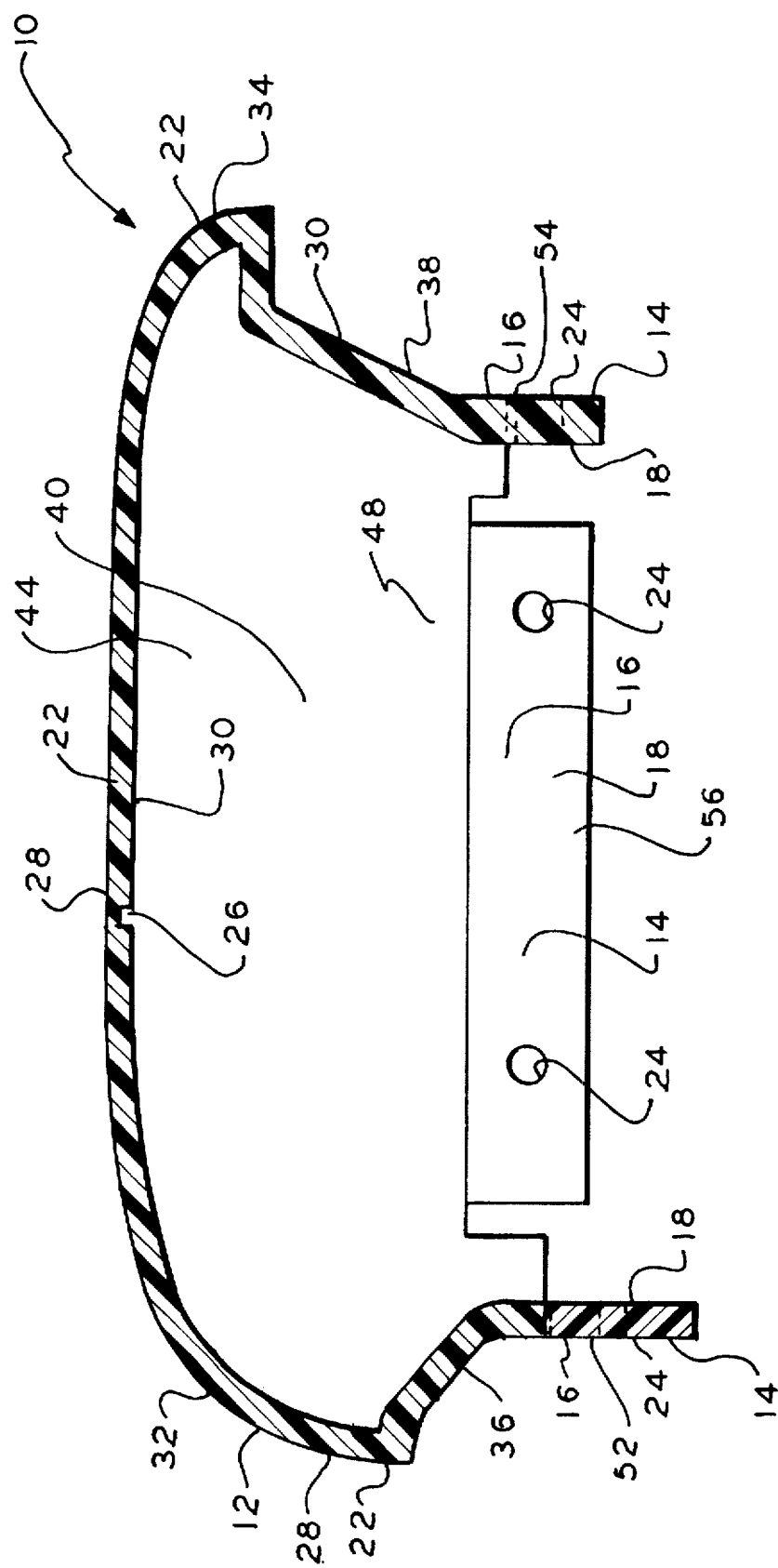

METHOD OF MANUFACTURING AN AIR BAG COVER

This application is a continuation of application Ser. No. 07/955,419, filed Oct. 2, 1992, now abandoned.

BACKGROUND OF THE INVENTION

1. Field of the Invention

The present invention relates to a cover for an air bag disposed on the hub of a steering wheel used in automobiles. It also includes an injection-molding method for manufacturing the cover.

2. Prior Art

In order to decrease occupant injuries resulting from most typical automobile collisions, seat belts are installed in passenger vehicles for the driver as well as passengers occupying the vehicle. The use of individual seat belts helped to decrease occupant injuries in most types of automobile collisions. Nevertheless the driver of the automobile and the front seat passenger were often thrown forward and injured, particularly in head-on collisions, when the automobile suddenly collides with another vehicle. In such cases, injury was frequently suffered because the seat belt, even if properly utilized, failed to provide the required body restraint to prevent against sudden hard contact with the steering wheel or instrument panel. This was due of the close proximity of the driver to the steering wheel and the close proximity of the front seat passenger to the instrument panel, respectively.

To provide additional occupant protection, inflatable air bags were installed in such passenger vehicles. Air bags would be disposed in the hub of the steering wheel to protect the driver another air bag would be disposed in the instrument panel, in front of the front seat passenger, to protect the passenger. The air bag in the steering wheel is designed to convert from a folded inoperative position into an inflated operative position in order to cushion the driver of the automobile in the event of a collision. The air bag in its folded position is connected at its bottom edge to a gas generator device equipped with a diffuser section and attached to the hub of a steering wheel. The air bag is disposed in a recess within the central portion of the steering wheel and it is held in position by a cover.

In the past, when an air bag was inflated, the weakened line on the cover would rupture and the air bag would be deployed. However, sometimes when the air bag deploys, the cover breaks into small pieces, scattering and flying into the face of the occupant opposite it or in the face of other occupants of the automobile. Another associated problem existing when the air bag deploys is that forces of considerable magnitude operate on the mounting portions of the air bag cover or those portions of the air bag cover which are affixed to the fixed part of the automobile.

A proposed solution to this problem was to design a cover having a two layer lid portion comprising a soft outer surface layer and a rigid inner core layer to which the soft outer surface layer is bonded to; this design obviates the aforementioned problems in that as the air bag deploys, the rigid inner core layer is prevented from breaking into small pieces by the outer adhering soft layer. However, such a design has certain problems associated therewith.

If two separate mold cavities are used for each of the two layers, it is necessary to move the rigid inner core layer formed by one of the mold cavities to the other mold cavity used to form the soft outer surface layer; then the soft outer surface layer is injected into its mold cavity and over the complete surface of the lid portion of the rigid core. Utilization of a split mold to form the two layer structure, presents additional problems concerning removal of the two layer structure from the mold, as well as, requiring a very complex mold, particularly if the structure includes undercuts. Furthermore, adequate bonding or adhesion between the two layers is difficult to achieve with the previously described methods because of the extensive contact area between these two layers.

Accordingly, it is an object of this invention, to provide an improved cover, for an air bag, used in an automobile.

Another object of the present invention is to provide an improved air bag cover, which rips open, in a safe and reliable manner, when the air bag is deployed.

A still further object of the present invention, is to provide a cover for an air bag, which substantially eliminates the possibility of the lid portion of the cover, from breaking into small pieces, and scattering within the occupant compartment portion of the automobile, when the air bag deploys.

A further object of the present invention, is to provide an air bag cover, having mounting side wall portions, which can withstand the forces developed against them, when the air bag deploys.

Another object of the present invention, is to provide, a method for injection-molding the aforedescribed cover, which requires only a simple molding process.

A still further object of the present invention, is to provide a cover for an air bag, which does not require a two-layer structure, to eliminate breaking and scattering of the lid portion of the cover, and which can be simply and inexpensively manufactured.

SUMMARY OF THE INVENTION

The present invention relates to a cover for an inflating type occupant restraint device such as an air bag used in a vehicle and a method for manufacturing the cover.

In its broader aspects, the cover comprises a lid portion and mounting side wall portions. The lid portion has a weakened line which opens when the air bag is deployed. The mounting side wall portions have upper and lower ends, the upper ends of which are connected to the lid portion and the lower ends are adapted for connection to a fixed part of the vehicle. The cover is an integral structure. The lid portion comprises a flexible and soft layer, whereas the mounting side wall portions comprise a rigid layer; the two layers are united at their points of contact or where their materials come together. The material used for the lid portion is a thermoplastic synthetic resin elastomer material and the material used for the mounting side wall portions is a rigid thermoplastic synthetic resin material.

The method for manufacturing the cover described above, in its broader aspects, comprises a two step injection-molding process. The thermoplastic synthetic resin elastomer material, in molten form, is injected through a first entry point(s) or gate(s) into a second mold cavity of an injection-mold for molding the mounting side wall portions. The first mold cavity is in communication with the second mold cavity.

In the preferred embodiment of the method, the second mold cavity is closed, while the first mold cavity is open, during the period of time the lid portion is being molded. Then the second mold cavity is opened to form the mounting side wall portions before the material in the first mold cavity cools down.

Another embodiment of the method has both first and second mold cavities. open at the same time that the elastomer material and the rigid resin material is injected, in another form, into their respective mold cavities.

In both the above embodiments of the method, and during the period of time that the rigid resin material, in molten form, is injected into an open second mold cavity, a movable rod member is disposed within the open second mold cavity, whereby a securing means, such as apertures, are formed with the lower end of the mounting side wall portions, which are adapted for connection to the fixed part of a vehicle.

In narrower aspects, the cover described above, includes a weakened line in the shape of an H, which ruptures under the forces applied to it by the inflating air bag. The lid portion, and the mounting side wall portions, each comprise only a single layer. Apertures are formed in the mounting side wall portions, permitting them to be secured to the previously described parts. These mounting side wall portions, form a generally rectangular configuration in cross section.

The lid portion further comprises a flat top section and upper and lower side sections. These upper and lower side sections comprise upper and lower arcuate shaped intermediate side sections, respectively, connected to the upper and lower sides of the top section. These upper and lower side sections also comprise, upper and lower flat bottom side portions, which are connected to the upper and lower intermediate side sections. The lid portion also comprises, first and second side sections, which sections comprise, first and second flat intermediate side sections, connected to the first and second sides of the top section of the lid portion. The lid portion further comprises, first and second flat bottom side sections, connected to the first and second intermediate side sections, respectively. The mounting side wall portions comprise upper and lower mounting side wall members, which are connected to the upper and lower side sections, respectively. The mounting side wall portions further comprise, first and second mounting side wall members, which are connected to the first and second bottom side sections, respectively.

Other objects, features and advantages of the present invention will become apparent from the subsequent description and the appended claims taken in conjunction with the accompanying drawings.

BRIEF DESCRIPTION OF THE DRAWINGS

FIG. 3 is a sectional view taken along the line 3—3 of FIG. 2;

DETAILED DESCRIPTION OF THE PREFERRED EMBODIMENT

Figure 1:
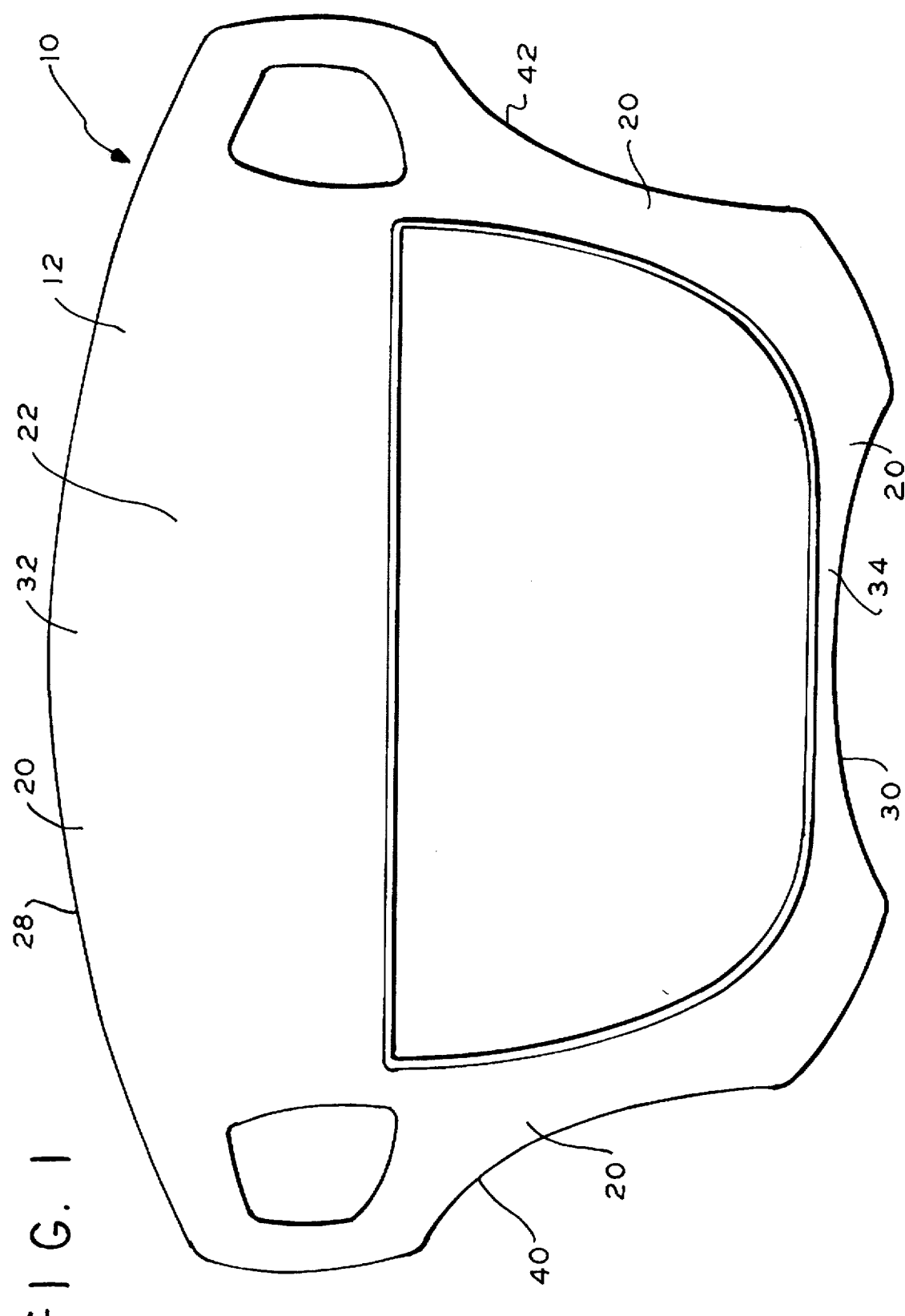
FIG. 1 is a top plan view of the cover for an air bag in accordance with the present invention.
Figure 2:
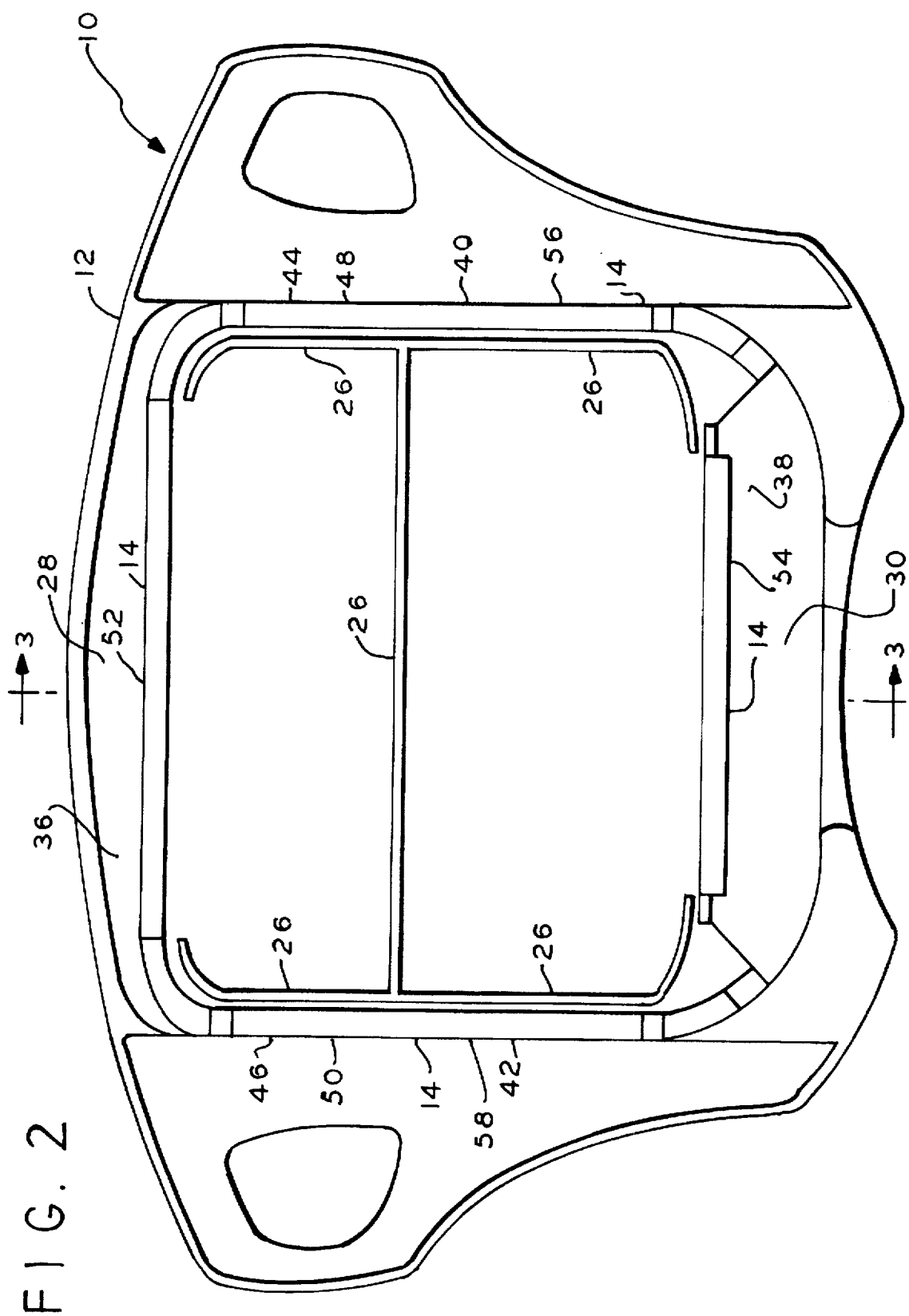
FIG. 2 is a bottom plan view of the cover shown in FIG. 1.

Referring to FIGS. 1 to 3. the cover is generally designated by reference numeral 10 and comprises, a lid portion 12, and mounting side wall portions or mounting portions 14, connected to said lid portion 12. The cover 10 is an integral structure, and the lid portion 12 ia formed of a single layer, of a soft and flexible material, preferably a thermoplastic synthetic resin elastomer material; the mounting side wall portions 14, are formed of a single layer of rigid material, preferably a thermoplastic synthetic resin material, and both materials are united or bonded under pressure, by an injection-molding process described subsequently in detail. The mounting side wall portions 14 have upper and lower ends 16 and 18, respectively, the upper ends 16 thereof being connected inward of the edges 20 of the generally flat top section 22 of the lid portion 12. The lower ends 18 of the mounting side wall portions 14, are adapted for connection to a fixed part of a vehicle. such as the center hub of a steering column assembly (not shown), or another part, such as a base plate, which is supported by a center hub and upon which, an air bag and inflator are disposed (also not shown), both of the immediately preceding members hereinafter referred to as "parts". Each of the four mounting side wall portions 14 are essentially in the form of a flat elongated (side wall) member, and they form a generally rectangular configuration in cross section, as is best seen in FIG. 2. A plurality, two, of aperatures 24 are formed in the lower end 18 of said mounting side wall members 14 and are adapted and used for securing each of the members 14 to said parts. The top section 22 of the lid portion 12, has a weakened or tear line(s) 26 formed therein (FIG. 2), which line(s) is in the shape of an H, and which line ruptures or breaks, under the forces applied to it by an inflating type occupant restraint device (not shown) or air bag (not shown).

The lid portion 12 essentially comprises, in addition to the top section 22, upper and lower sides 28 and 30, respectively, which upper and lower sides 28 and 30 comprise upper and lower arcuate intermediate side sections 32 and 34, respectively, are flat, inwardly inclined, upper and lower, bottom side sections 36 and 38, respectively. The lid portion 12 also comprises first and second side sections 40 and 42, which comprise, first and second flat intermediate side sections 44 and 46, respectively, and first and second flat bottom side sections 48 and 50, respectively. The mounting side wall portions 14 comprise, a pair of opposed, spaced apart, upper and lower mounting side wall members 52 and 54 and a pair of opposed, spaced apart, first and second mounting wall members 56 and 58, respectively.

The lid portion 12 is connected to the mounting side wall portions 14, at its upper and lower sides 28 and 30, respectively, through upper and lower bottom side sections 36 and 38; the upper and lower mounting members 52 and 54, have their upper ends 16 connected to said upper and lower bottom side sections 36 and 38. The lid portion 12 is also connected to the mounting side wall portions 14, at its first and second sides 40 and 42, respectively, through first and second bottom side sections 48 and 50, respectively; the first and second mounting members 56 and 58, have their upper ends 16 connected to said first and second bottom side sections 48 and 50. The first and second sides 40 and 42 of said lid portion 12, and the first and second mounting members 56 and 58 of said mounting side wall portions 14, form a planar surface at both its outer and inner surfaces.

Figure 4A:
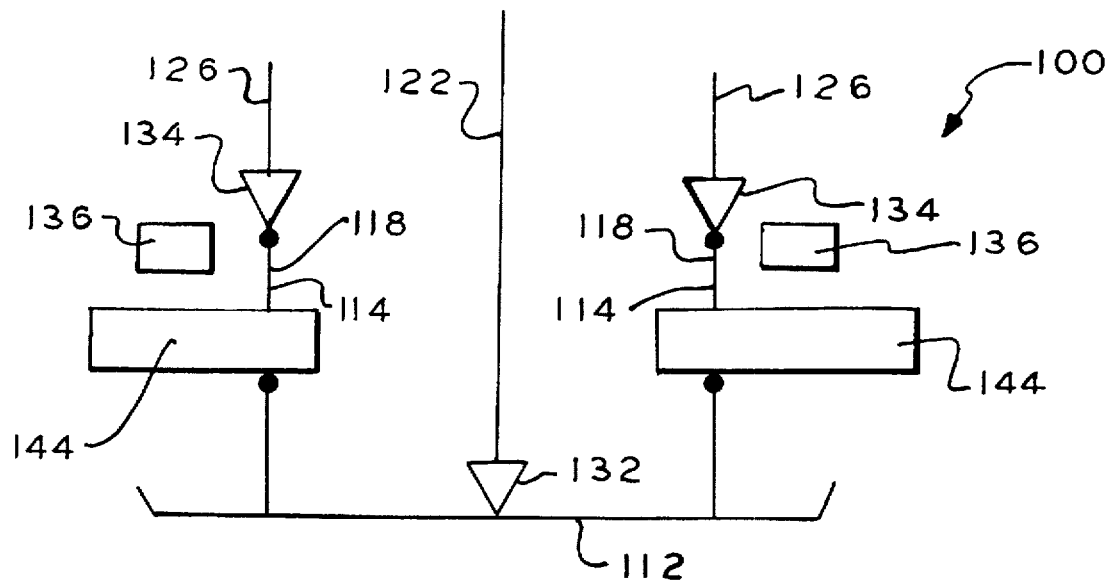
FIG. 4A is a schematic drawing of one step of the preferred method, used to produce the cover, shown in FIGS. 1 to 3, in accordance with the present invention.
Figure 4B:
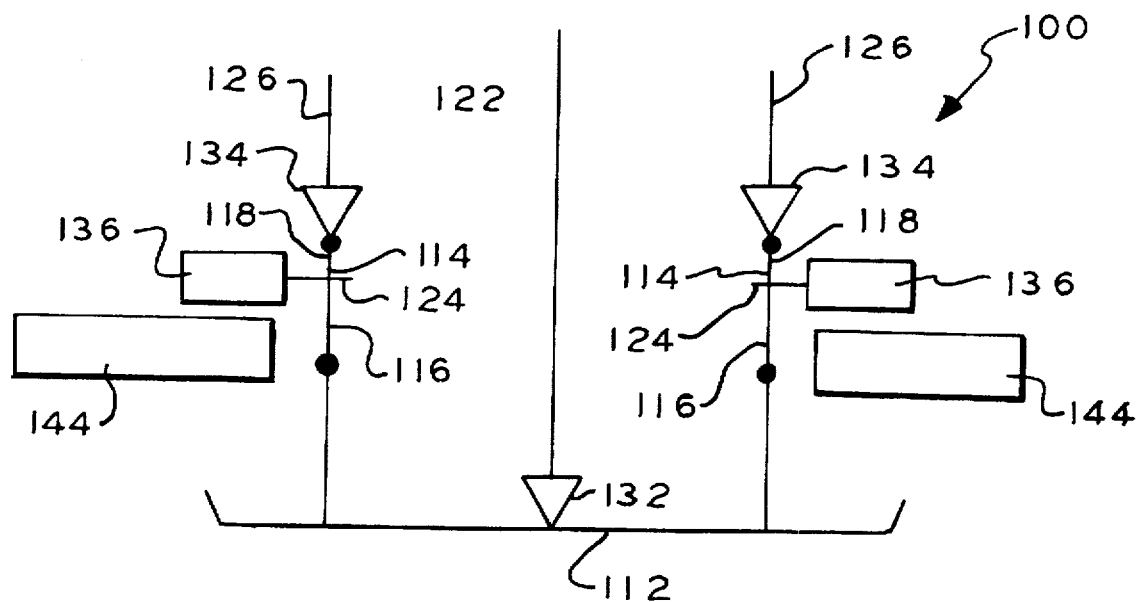
FIG. 4B is a schematic drawing of the next step of the preferred method.

Referring now to FIGS. 4A and 4B, which schematically illustrate a preferred embodiment of the method of manufacturing or producing, by injection-molding, the cover 10 of the present invention, which cover 10 has been described in detail previously. An injection mold 100, utilized to produce the cover 10, comprises a first mold cavity 112 for molding the lid portion 12, and a second mold cavity 114, for molding the mounting side wall portions 14; the first mold cavity 112, and the second mold cavity 114, are in communication with one another. A first materials transmitting means or first hot runner block 122, is in communication with the first mold cavity 112, through a first entry point(s) or gate(s) 132. A second materials transmitting means or second hot runner block 126, is in communication with the second mold cavity 114 through a second entry point(s) or gate(s) 134. A pair of cavity blocking means 144, are disposed directly adjacent to the upper ends 116 (FIG. 4B) of said second mold cavity 114, and when actuated, move into the second mold cavity, so as to block any material injected into the first mold cavity 112, from flowing into the second mold cavity 114. A plurality of movable rod members 124 (only two of which are shown) are disposed directly adjacent to the lower ends 118 of the second mold cavity 114 and when actuated by controlling rod actuators 136, move into said lower ends 118, of the second mold cavity 114; when material is injected into this second mold cavity 114, while rod members 112 is disposed therein, a securing means or aperatures 24 are formed within the lower end 18 of the mounting side wall portions 14. These aperatures 24, as previously explained, are adapted for use in connecting the side wall portions 14 to the fixed part or another part of a vehicle.

The production method, in accordance with its preferred embodiment, requires that the cavity blocking means 144 be actuated, thereby disposing it within the upper ends 116, of the second mold cavity, to block any material from flowing into it, as shown in FIG. 4A. Then, molten thermoplastic synthetic resin elastomer material is injected into the first mold cavity 112, through the first hot runner block 122, and first gate 132, which is moved to its open position. Then the cavity blocking means 144, are de-energized, to move them out of the second mold cavity 114, and before the thermoplastic synthetic resin elastomer material cools down, in the first mold cavity 112, molten thermoplastic synthetic resin material, is injected into the second mold cavity 114, through the second hot runner blocks 126, and second gates 134. These gates are moved to their open position, to form the mounting side wall portions 14. At the same time the cavity blocking means 144 are de-energized, the rod actuators 136 are actuated, to move the rod members 124 into the lower ends 118 of the second mold cavity 114, thereby forming aperatures 24 within the lower ends 18, of the mounting side wall portions 14. During this period, the soft and flexible thermoplastic synthetic resin elastomer material, forming the lid portion 12, and the rigid thermoplastic synthetic resin material forming the mounting side wall portions 14, unite or bond under the high pressure of the injection-molding process. After the two materials in the mold 100 cool, the molds are opened and the cover 10 is removed. In the aforedescribed injection-molding process, the two materials "bite" into each other forming contact points or a contact region that achieves a high tensile strength, and therefore results in a cover 10 of excellent integrity, high quality, and good performance.

Figure 4C:
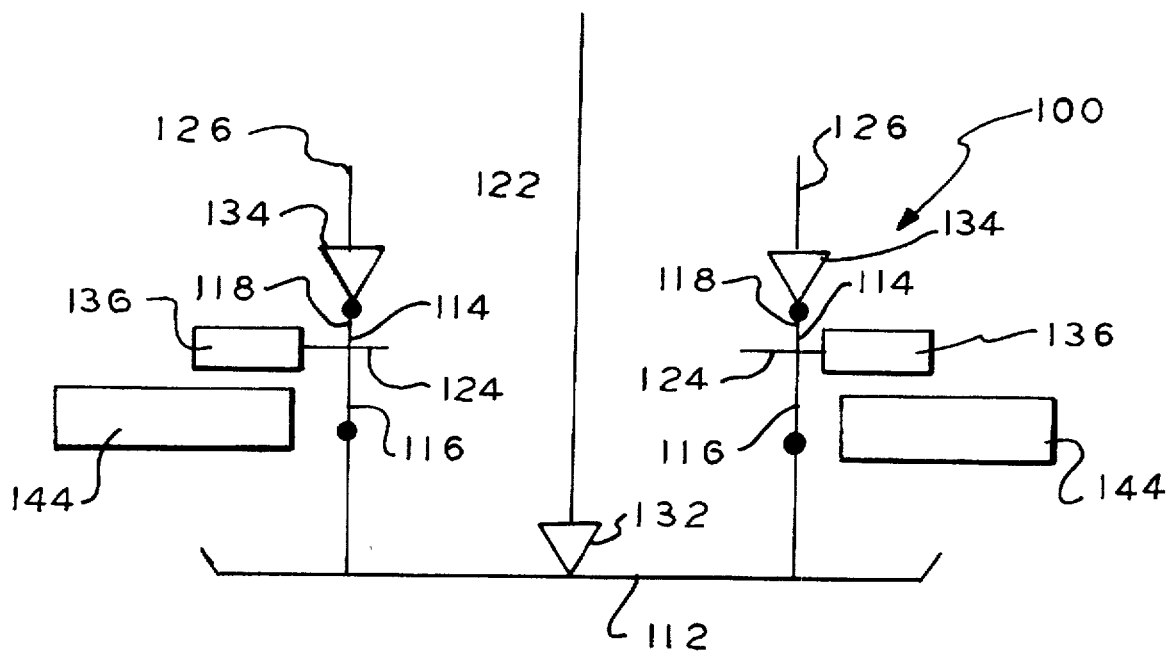
FIG. 4C is a schematic drawing of another embodiment of a method, used to produce the cover shown in FIGS. 1 TO 3, in accordance with the present invention.

A production method, in accordance with another embodiment, is illustrated in FIG. 4C. In this embodiment both the first and second mold cavities 112 and 114, respectively, are maintained open, at the same time as both molten materials are injected into their respective molds. More particularly, molten thermoplastic synthetic resin elastomer material is injected into the first mold cavity 112, through the first hot runner block 122, and first gate 132, which is moved into its open position. At the same time molten thermoplastic synthetic resin material is injected into the second mold cavity 114, through the second hot runner blocks 126 (which is completely open as the cavity blocking means 144 are held in their de-energized condition) and second gates 134, which are held in their open position. At the same time, the rod actuators 136 are actuated, to move the rod members 124 into the lower ends 118 of the second cavity 114, thereby forming aperatures 24 within the lower end 18 of the mounting side wall portions 14. Consequently, both the lid portion 12, and the mounting side wall portions 14, are formed at the same time.

A variation of the second embodiment of the production method necessitates that though both cavities 112 and 114 are maintained opened, during the injection process, only one material is injected, at any time, into its respective mold cavity. For example, while both mold cavities 112 and 114 are open, the molten thermoplastic resin elastomer material is first injected into the first mold cavity 112, through the first hot runner block 122 and first gate 132, which is in its open position, to form the lid portion 12; then after the aforedescribed step is completed, but before such thermoplastic synthetic resin elastomer material cools down in its first mold cavity 112, molten thermoplastic synthetic resin material, is injected into the open, second mold cavity 114, through the second hot runner blocks 126 and second, open, gates 134, to then form the mounting side wall portions 14. The aperatures 24 are also formed at the same time as the mounting side wall portions 14, and in the same manner as described in the preceding embodiment.

It is to be understood that various changes and modifications can be made in the invention without departing from the scope of the invention as defined by the appended claims.

What is claimed:

1. A method for manufacturing a cover for an inflatable type occupant restraint device, said cover comprising a top lid member having an upper surface and an under surface, said top lid member formed from a single layer of a flexible thermoplastic synthetic resin material in a first mold cavity of a first injection-mold means and a side wall member defined by a plurality of side walls generally defining a rectangular configuration extending from said under surface, each side wall of said plurality of side walls having an upper edge and a lower edge and said each side wall integrally connected along its respective said upper edge to said under surface of said top lid member, said side wall member formed from a single laser of a rigid thermoplastic synthetic resin material in a second mold cavity to a second injection-mold means, said second injection-mold means mounted in alignment with and in vertical communication with said first injection-mold means, comprising the steps of:

a) mounting said second injection-mold means on, and vertically above said first injection-mold means so that said first mold cavity is directly below and under said second mold cavity, and said first mold cavity and said second mold cavity are in vertical communication with each other only along a line defined by a meeting of said upper edge of said each side wall and said under surface of said top lid member;

b) injecting said flexible thermoplastic synthetic resin material through a first gate means in said first injection-mold means into said first mold cavity for completely forming said top lid member; and, c) injecting said rigid thermoplastic synthetic resin material through a second gate means in said second injection-mold means for forming only said side wall member in said second mold cavity, said rigid thermoplastic synthetic resin material merging with said flexible thermoplastic synthetic resin material only along said line defined by said meeting of said upper edge of said each side wall and said under surface of said top lid member for integrally connecting said top lid member and said side wall member for forming said cover.

2. A method for manufacturing a cover as in claim 1 wherein step a) includes:

disposing said second injection-mold means vertically above said first injection-mold means so that said second mold cavity forming said upper edge of said side walls of said side wall member is in communication with said first mold cavity forming said under surface of said lid member.

3. A method for manufacturing a cover as in claim 1 and further including the step of:

actuating a movable rod means for driving said rod means into said second mold cavity for creating an aperture in at least one of said side walls.

4. A method for manufacturing a cover as in claim 1 and further including the step of:

blocking communication between said first mold cavity and said second mold cavity during step b).

5. A method for manufacturing a cover as in claim 4 and further including the step of:

unblocking communication between said first mold cavity and said second mold cavity after completion of step b) and before commencing step c).

* * * * *